(12) United States Patent
Dethleffsen et al.

(10) Patent No.: US 12,071,129 B2
(45) Date of Patent: Aug. 27, 2024

(54) DEVICE FOR CONTROLLING A DRIVING SPEED

(71) Applicant: MAN Truck & Bus SE, Munich (DE)

(72) Inventors: Niels Dethleffsen, Munich (DE); Robert Pietsch, Munich (DE); Julia Behringer, Munich (DE)

(73) Assignee: MAN Truck & Bus SE, Munich (DE)

( * ) Notice: Subject to any disclaimer, the term of this patent is extended or adjusted under 35 U.S.C. 154(b) by 378 days.

(21) Appl. No.: 17/626,479

(22) PCT Filed: Jul. 6, 2020

(86) PCT No.: PCT/EP2020/068938
§ 371 (c)(1),
(2) Date: Jan. 11, 2022

(87) PCT Pub. No.: WO2021/004986
PCT Pub. Date: Jan. 14, 2021

(65) Prior Publication Data
US 2022/0281449 A1    Sep. 8, 2022

(30) Foreign Application Priority Data
Jul. 11, 2019  (DE) .......................... 102019004883.0

(51) Int. Cl.
*B60W 30/14* (2006.01)
*B60W 50/00* (2006.01)

(52) U.S. Cl.
CPC .......... *B60W 30/143* (2013.01); *B60W 50/00* (2013.01); *B60W 2050/0028* (2013.01);
(Continued)

(58) Field of Classification Search
CPC ............................ B60W 30/143; B60W 50/00
See application file for complete search history.

(56) References Cited

U.S. PATENT DOCUMENTS

| 5,155,375 A | 10/1992 | Holley |
| 7,833,127 B2 * | 11/2010 | Petzold ................. B60W 10/02 477/901 |

(Continued)

FOREIGN PATENT DOCUMENTS

| DE | 10147090 A1 | 4/2003 |
| DE | 102005045891 | 2/2007 |

(Continued)

OTHER PUBLICATIONS

German Search Report issued in German Patent Application No. 102019004883.0 dated Mar. 18, 2020. No English translation available.

(Continued)

*Primary Examiner* — Ramsey Refai
(74) *Attorney, Agent, or Firm* — Weber Rosselli & Cannon LLP

(57) ABSTRACT

The present disclosure relates to technology for controlling a driving speed of a utility vehicle. According to one embodiment, a device includes: a speed sensor that detects the driving speed of the utility vehicle; a wind speed sensor or a data interface that detects a wind speed on or in front of the utility vehicle; a locating unit that locates the utility vehicle on a route travelled by the utility vehicle; and a control unit that controls the driving speed of the utility vehicle according to the detected driving speed, the detected wind speed and a topography ahead of the utility vehicle on the route according to the location. With the topography ahead of the utility vehicle, the controlled driving speed is an increasing function of the detected wind speed in the direction of the driving speed.

19 Claims, 3 Drawing Sheets

(52) U.S. Cl.
CPC ..... *B60W 2300/10* (2013.01); *B60W 2300/12* (2013.01); *B60W 2420/22* (2013.01); *B60W 2510/1005* (2013.01); *B60W 2520/10* (2013.01); *B60W 2552/15* (2020.02); *B60W 2555/20* (2020.02); *B60W 2556/45* (2020.02); *B60W 2720/10* (2013.01)

(56) References Cited

U.S. PATENT DOCUMENTS

| | | | | |
|---|---|---|---|---|
| 9,849,802 | B2* | 12/2017 | Chow | B60L 3/12 |
| 10,071,735 | B2* | 9/2018 | Merzig | B60W 30/143 |
| 11,112,004 | B2* | 9/2021 | Shultz | F16H 61/0021 |
| 2008/0039280 | A1* | 2/2008 | Petzold | B60W 30/18027 |
| | | | | 477/70 |
| 2016/0114698 | A1* | 4/2016 | Chow | B60L 3/12 |
| | | | | 701/22 |
| 2016/0297434 | A1 | 10/2016 | Merzig et al. | |
| 2018/0164111 | A1* | 6/2018 | Jung | G08G 1/01 |
| 2019/0122546 | A1* | 4/2019 | Lu | G08G 1/0133 |
| 2019/0138021 | A1 | 5/2019 | Merzig | |

FOREIGN PATENT DOCUMENTS

| | | |
|---|---|---|
| DE | 102016223299 A1 | 5/2018 |
| JP | 2013082255 A | 5/2013 |
| KR | 20180057458 A | 5/2018 |
| WO | 2012158097 A1 | 11/2012 |
| WO | 2017164792 A1 | 9/2017 |

OTHER PUBLICATIONS

PCT Search Report and Written Opinion issued in PCT Application No. PCT/EP2020/068938 dated Oct. 29, 2020, with English translation.

The First Office Action issued in Chinese Patent Application No. 202080049321.4 dated May 9, 2024 with English translation.

* cited by examiner

DEVICE FOR CONTROLLING A DRIVING SPEED

CROSS-REFERENCE TO RELATED APPLICATIONS

This application is a 371 application of PCT/EP2020/068938 filed Jul. 6, 2020, which claims benefit of and priority to German Patent Application Serial No. DE102019004883.0 filed Jul. 11, 2019, the disclosures of the above-identified applications are hereby incorporated by reference in their entirety.

The present disclosure relates to a technique for controlling a driving speed of a commercial vehicle. In particular, a device for controlling a driving speed and a corresponding commercial vehicle are described.

Today, the fuel consumption of a truck or bus is optimized by limiting the maximum speed relative to the route of the commercial vehicle in a drive mode, for example, to 85 km/h instead of 90 km/h (especially for trucks). For further optimization, a speed control system can combine topographic maps with satellite-based location, also known as GPS cruise control. For this purpose, the driving speed is reduced uphill in drive mode compared to an average speed specified by the driver. Downhill in a thrust mode, the driving speed exceeds the average speed in order to make up the time previously lost compared to the average speed without additional fuel use.

Since conventional speed control systems control the driving speed only according to predictable environmental conditions, the commercial vehicle may travel slower on the ascent—and thus require more driving time—than would be necessary for optimal or predetermined fuel consumption, for example because a tailwind would have made it possible to drive faster with the same fuel consumption. Similar considerations also apply to electric drives.

In addition, conventional speed control systems can even reduce fuel consumption. Since the driving speed is controlled only according to predictable environmental conditions, it may be that the commercial vehicle shifts back to a higher gear during the ascent and thus drives in drive mode with an excessively low driving speed which is suboptimal for the driving time or an excessively high engine revolution rate which is suboptimal for fuel consumption, for example because the tailwind acting on the commercial vehicle during the ascent would not have required the shifting process.

As a result, conventional speed control systems can miss the target of optimum fuel consumption or even degrade this.

Thus, the object is to improve the control of the driving speed, in particular to optimize travel time and/or energy consumption.

This object is achieved by a device and a corresponding commercial vehicle with the features of the independent claims. Advantageous embodiments and applications of the present disclosure are the subject matter of the dependent claims and are explained in more detail in the following description with partial reference to the figures.

According to one aspect, a device is provided to control a driving speed of a commercial vehicle. The device includes a speed sensor designed to detect the driving speed of the commercial vehicle. The device also includes a wind speed sensor or a data interface which is designed to detect a wind speed at or in front of the commercial vehicle. The device also includes a locating unit designed to locate the commercial vehicle on a route being used by the commercial vehicle. The device also includes a control unit designed to control the driving speed of the commercial vehicle depending on the detected driving speed, the detected wind speed and a topography ahead of the commercial vehicle according to the location on the route. The controlled driving speed is an increasing (for example, strictly monotonically increasing) function of the detected wind speed in the direction of the driving speed in the topography ahead of the commercial vehicle.

Since the controlled driving speed for the topography ahead of the commercial vehicle is an increasing function of the detected wind speed in the direction of the driving speed, in one embodiment of the device on an ascent (as an example of the topography ahead), the controlled driving speed may be greater than a driving speed precalculated solely on the basis of the topography ahead if the detected wind speed is positive in the reference system of the commercial vehicle or in the reference system of the route in the direction of the driving speed (which is also referred to as a driving wind or generally a tailwind). As a result, travel time and/or drive energy can be saved or optimized.

Any dependence on the topography ahead can be realized as a dependence on a gradient angle of the route ahead. The gradient angle can be an angle between the route in the longitudinal direction and a horizontal plane.

Alternatively or additionally, the gradient angle can be positive for an ascent or negative for a descent.

The gradient angle can be a function of a distance travelled along the route. For example, the dependence on the topography ahead may include a dependence on the gradient angle at the location of the commercial vehicle and on a change in the gradient angle on the route ahead, for example a first and/or second derivative of the gradient angle as a function of the distance travelled.

The control unit may control and/or regulate an acceleration (in particular the fuel injection of an internal combustion engine and/or the power control of an electric machine) and/or a deceleration (in particular braking and/or recuperation) of the commercial vehicle depending on a difference, $v_F^{(soll)} - v_F^{(ist)}$, calculated between the target value of the driving speed (i.e. the controlled driving speed $v_F^{(soll)}$) and actual value of the driving speed (i.e. the detected driving speed $v_F^{(ist)}$, which is output to an engine controller.

The "control" of the driving speed by means of the control unit may consist in the fact that the detected driving speed is an input variable of the control unit, i.e. that the controlled driving speed (for example the controlled acceleration or deceleration) also depends on the detected driving speed.

In each exemplary embodiment, the controlled driving speed may further be subject to an upper speed limit and/or a lower speed limit. When the upper speed limit is reached, the control unit can limit the controlled speed to it. The control unit can prevent the controlled speed from becoming lower than the lower speed limit.

For example, the driver of the commercial vehicle can set control parameters. The control parameters can include an average speed and optionally at least one magnitude of a deviation (for example, above and/or below) from the average speed. From the control parameters, the control unit can determine the corresponding speed limit and apply it to the control.

The control unit may control the driving speed relative to the ambient air of the commercial vehicle due to the dependence on the detected wind speed. For example, the driving speed, precalculated only on the basis of topography, can be applied relative to the wind speed when controlling the driving speed. The detected and/or controlled driving speed of the commercial vehicle may be calculated or output as the value of the speed of the commercial vehicle relative to the route. For example, the detected wind speed and the driving speed precalculated solely on the basis of the topography can be added, for example added with weightings.

The detected wind speed (in particular in the direction of the driving speed) may include a wind speed in the reference system of the commercial vehicle. The wind speed detected in the reference system of the commercial vehicle in the direction of the driving speed may be negative as the airstream speed.

The controlled driving speed can be $$v_F^{(soll)} = v_F^{(topo)} + \varepsilon \cdot v'_W{}^{(ist)} \text{ (preferably applied if } 0 < v'_W{}^{(ist)} \text{ or} \quad \text{(first alternative)}$$

$$v_F^{(soll)} = v_F^{(topo)} + \varepsilon \cdot (v'_W{}^{(ist)} + v_F^{(ist)}) \quad \text{(second alternative)}$$

wherein $v_F^{(topo)}$ may denote a driving speed precalculated on the basis of the topography ahead, $v'_W{}^{(ist)}$ may denote the detected wind speed in the reference system of the commercial vehicle, a parameter $\varepsilon$ with $0<\varepsilon\leq1$ may denote a degree of consideration of the wind speed, and, where appropriate, $v_F^{(ist)}$ may denote the detected driving speed.

The case $v'_W{}^{(ist)} + v_F^{(ist)} > 0$ can also be referred to as a tailwind (for example a general tailwind). The case $v'_W{}^{(ist)} + v_F^{(ist)} < 0$ can also be referred to as a headwind. The case $v'_W{}^{(ist)} > 0$ can also be referred to as a driving tailwind. The control according to the first alternative can be used in particular in the event of driving tailwinds (or referred to as "coasting"). The control according to the second alternative can be used in any case (or can be referred to as control of the driving speed relative to the wind speed).

Alternatively or in addition, the detected wind speed (in particular in the direction of the driving speed) may include a wind speed in a reference system of the route being used by the commercial vehicle.

The control of the driving speed may depend on a difference between the detected wind speed in the direction of the driving speed and the detected driving speed (first alternative) or directly on the detected wind speed (second alternative).

The controlled driving speed can be $$v_F^{(soll)} = v_F^{(topo)} + \varepsilon \cdot (v_W{}^{(ist)} - v_F^{(ist)}) \text{ (preferably applied if } 0 < v_F^{(ist)} < v_W{}^{(ist)} \text{ or} \quad \text{(first alternative)}$$

$$v_F^{(soll)} = v_F^{(topo)} + \varepsilon \cdot v_W{}^{(ist)} \quad \text{(second alternative)}$$

wherein $v_F^{(topo)}$ is a driving speed which is precalculated based on the topography ahead, $v_W{}^{(ist)}$ is the detected wind speed in the direction of the driving speed, a parameter $\varepsilon$ with $0<\varepsilon\leq1$ is a degree of consideration of the wind speed, and if applicable $v_F^{(ist)}$ is the detected driving speed.

The case $v_W{}^{(ist)} > 0$ can also be referred to as a tailwind (for example a general tailwind). The case $v_W{}^{(ist)} < 0$ can also be referred to as a headwind. The case $v_W{}^{(ist)} > v_F^{(ist)}$ can also be referred to as a driving tailwind. The control according to the first alternative can be used in particular in driving tailwinds or referred to as "coasting". The control according to the second alternative can be used in any case or can be referred to as control of the driving speed relative to the wind speed.

The driving speed precalculated on the basis of the topography ahead may be determined relative to the route (i.e. in the static reference system of the route).

The parameter $\varepsilon$ of the degree of consideration of the wind speed may depend on the topography ahead and/or an efficiency-optimized operating point or operating range of a powertrain of the commercial vehicle.

The mechanical power supplied to the commercial vehicle by a tailwind (for example a driving tailwind and even more so by a general tailwind) may be less than the drive power necessary for maintaining the controlled driving speed (for example, due to an ascent and/or the rolling resistance). For example, in the case of a level route, due to the rolling resistance, power from the drive train is necessary even if the target value of the driving speed is to be achieved in the first alternative (for example the target value $v_F^{(topo)} + v_W{}^{(ist)} - v_F^{(ist)} = v_F^{(topo)} + v'_W{}^{(ist)}$ at $\varepsilon=1$, i.e. to completely eliminate the aerodynamic drag with a driving tailwind), and especially in the second alternative (for example if the wind speed does not allow the elimination of the aerodynamic drag at all).

In one exemplary embodiment, in the case of a descent, the height energy (i.e., the potential energy of the gravity field) can apply the necessary drive power, so that (for example in the first or second alternative) $\varepsilon$ can be =1 in the case of a descent (as an example of the topography ahead). In comparison to the target value of the driving speed (for example in the first or second alternative) with $\varepsilon=1$, in the case of an ascent the drive train can only partially apply the work against the aerodynamic drag in addition to the height energy, for example, in order to work in an efficiency-optimized operating range, so that $0<\varepsilon<1$ in the case of an ascent (as an example of the topography ahead).

In each exemplary embodiment, the drive train may include the internal combustion engine and/or the electric machine (e-machine).

The data interface can include a wireless data interface to a server. The server can provide weather data. The weather data may include the wind speed at or in front of the located commercial vehicle.

The radio data interface can be designed for data exchange by means of a cellular mobile network. The radio data interface and/or the mobile network can communicate with a radio access technology according to a standard of the "Third Generation Partnership Project" (3GPP), in particular according to "Long Term Evolution" (LTE) or "Fifth Generation New Radio" (5G NR).

The detected wind speed can be based on satellite recordings and/or ground-level measurements. For example, the weather data may include flight weather data. The ground-level measurements may be detected by means of a network of measuring stations parallel to the route (especially along highways).

The wind speed sensor may include strain gauges, for example between a chassis and a body of the commercial vehicle, in particular between the chassis and the cab of the commercial vehicle. The strain gauges may be designed to detect a dynamic pressure depending on the wind speed in the reference system of the commercial vehicle, optionally including an impact pressure of a precipitation.

The strain gauges may be placed between the chassis (also known as: the basic frame or frame) of the commercial vehicle and the bodywork (in particular a front) of the commercial vehicle. Alternatively or additionally, the strain gauges may be arranged within the front of the commercial vehicle, for example, on a vertical surface portion of the front.

Precipitation may include raindrops and/or snow and/or hailstones. An impact of the precipitation on the body (especially on the cab) can transfer a horizontal component of the impulse of the precipitation to the body. The horizontal component of the impulse transmitted per time and area can correspond to the impact pressure. The dynamic pressure can be composed of dynamic air pressure due to the aerodynamic drag and the impact pressure.

The wind speed sensor may include at least one dynamic pressure probe located on a front of the commercial vehicle (for example, a Pitot tube or a Prandtl dynamic pressure tube).

Each pressure probe may be designed to detect a dynamic pressure depending on the wind speed in the reference system of the commercial vehicle. In order to detect the wind speed, the at least one pressure probe may additionally include a static pressure probe for measuring a static pressure component.

In each implementation of the wind speed sensor, the dynamic pressure can be a difference between a total horizontal pressure component and the static pressure component. For example, the dynamic pressure probe can deduct the total horizontal pressure component from the static pressure component. The strain gauges can detect the dynamic pressure.

The measured pressure can be a quadratic function of the wind speed thus detected.

The controlled driving speed may generally depend on the detected wind speed if the detected driving speed and/or the driving speed precalculated on the basis of the topography ahead exceeds a minimum speed, for example exceeds 60 km/h. Below the minimum speed, the wind speed may not be taken into account in the control of the driving speed.

The control unit may also be designed to take into account a (depending on the driving speed) shifting point of an automatic transmission in the powertrain of the commercial vehicle when controlling the driving speed. For example, a driving speed precalculated solely based on the topography may be lower than the shifting point, and the controlled driving speed may be greater than the shifting point if the topography ahead contains an ascent and the detected wind speed corresponds to a tailwind.

According to another aspect, a device is provided to control a driving speed of a commercial vehicle. The device includes a speed sensor which is designed to detect the speed of the commercial vehicle. The device also includes a radio data interface which is designed to capture a wind speed at or in front of the commercial vehicle from a server. The server provides data that include wind speed at or in front of the commercial vehicle. The device also includes a control unit designed to control the driving speed of the commercial vehicle depending on the detected driving speed and the detected wind speed. The controlled driving speed (for example in the case of a topography ahead of the commercial vehicle) is an increasing (for example, strictly monotonically increasing) function of the detected wind speed in the direction of the driving speed.

The device may also include a locating unit which is designed to locate the commercial vehicle on a route being used by the commercial vehicle. Location data of the located commercial vehicle can be sent to the server (for example, from the control unit) via the radio data interface. The data retrieved from the server via the radio data interface may include the detected wind speed at or in front of the located commercial vehicle.

The device according to the further aspect may further include one or more of the features described in the context of the first-mentioned aspect.

According to yet another aspect a motor vehicle, in particular a commercial vehicle, is provided, the powertrain of which comprises a device according to the previous aspect in one of the embodiment variants or which is controlled by such a device.

In any aspect, the commercial vehicle can be a truck, a towing vehicle or a bus.

Further features and advantages of the present disclosure are described below with reference to the accompanying drawings. In the figures.

Figure 1:
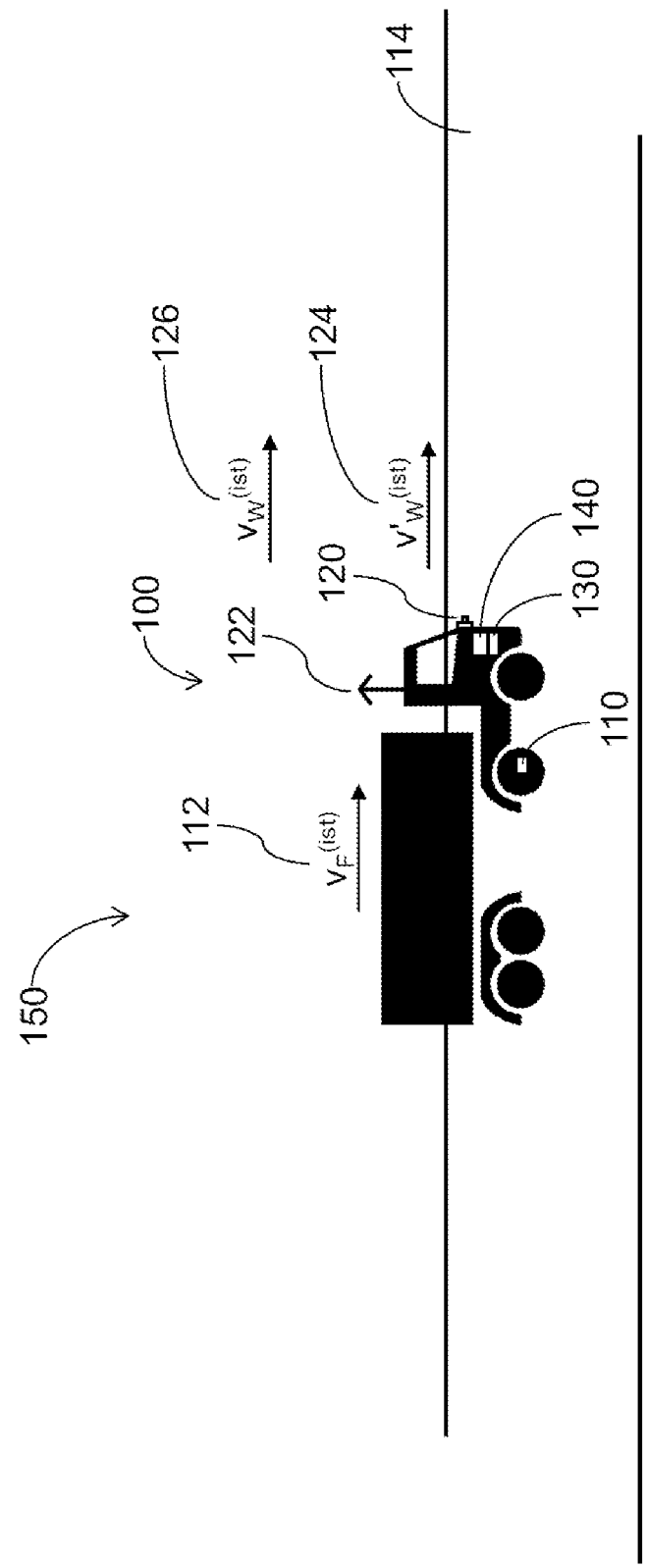
FIG. 1 shows a schematic side view of an exemplary commercial vehicle with an exemplary embodiment of a device for controlling a driving speed of the commercial vehicle.

FIG. 1 shows schematically an exemplary commercial vehicle 150 (for example, a truck or bus) with a device commonly designated with reference character 100 for controlling a driving speed of the commercial vehicle 150.

A first exemplary embodiment of the device 100 includes a driving speed sensor 110, a wind speed sensor 120 and/or a data interface 122, a locating unit 130 and a control unit 140.

The driving speed sensor 110 detects the driving speed 112 of the commercial vehicle 150. The wind speed sensor 120 and/or the data interface 122 capture a wind speed 124 or 126 at or in front of the commercial vehicle (150). The wind speed 124 is measured in the reference system of the commercial vehicle 150. The wind speed 126 is measured in the reference system of a route 114 (for example, a road or highway) of the commercial vehicle 150. The locating unit 130 locates the commercial vehicle 150 on the route 114 being used by the commercial vehicle 150, for example by means of a global navigation satellite system (in particular the "Global Positioning System" or GPS; the Global Satellite Navigation System GLONASS; "Galileo" and/or "Beidou") and/or a cellular mobile network (in particular 4G LTE or 5G NR).

The control unit 140 is designed to control the driving speed of the commercial vehicle 150 depending on the detected driving speed 112, the detected wind speed 124 and/or 126 and a topography 200 in accordance with the location on the route 114 ahead of the commercial vehicle 150. The controlled driving speed is an increasing function of the detected wind speed 124 and/or 126 in the direction of the driving speed in the topography 200 ahead of the commercial vehicle 150.

A second exemplary embodiment of the device 100, which can be combined with the first exemplary embodiment, comprises a driving speed sensor 110, a radio data interface 122 and a control unit 140.

The speed sensor 110 detects the driving speed 112 of the commercial vehicle 150.

The radio data interface 122 captures a wind speed of 126 at or in front of the commercial vehicle 150 from a server. The server provides data indicating the wind speed 126 (for example in the reference system of the route 114 of the commercial vehicle 150). The control unit 140 can be designed to call up the data from the server via the radio data interface. Where appropriate, the control unit 140 may convert the wind speed 126 in the reference system of the route 114 to the wind speed 124 in the reference system of the commercial vehicle by means of the detected driving speed 112.

The control unit 140 is designed to control the driving speed of the commercial vehicle 150 depending on the detected driving speed 112 and the detected wind speed 124 and/or 126. The controlled driving speed 210 (for example, in the case of a topography 200 ahead of the commercial vehicle 150) is an increasing function of the detected wind speed 124 and/or 126 in the direction of the driving speed.

In each exemplary embodiment, an average speed, also referred to as a cruising speed, may be predetermined and/or adjustable on the device 100. Optimization (i.e. minimization) of drive energy (for example fuel consumption or CO2 emissions with fossil fuels) and cruising speed is basically a conflict of objectives, since at driving speeds greater than a minimum speed (for example, greater than 60 km/h) the aerodynamic drag increasing quadratically with driving speed causes a significant or dominant component of the drive energy.

In each exemplary embodiment, the control unit 140 can control the driving speed along (i.e. relative to) the route 114 of the commercial vehicle 150 on the basis of the driving speed relative to the air around the commercial vehicle 150 in such a way that optimization is carried out of the conflict of objectives between the drive energy and the cruising speed at driving speeds greater than the minimum speed. The control can be carried out on its own or in combination with devices of a conventional speed control system (for example a GPS cruise control).

If the commercial vehicle 150 moves with a detected driving speed 112 (for example of 80 km/h) along the route 114 and there is no wind (i.e. the wind speed 126 in the reference system of the route 114 is zero or small compared to the detected driving speed 112), then the driving speed relative to the air is equal to the detected driving speed 112 (thus for example also equal to 80 km/h through the air). Accordingly, there is normal aerodynamic drag. However, if there is a headwind of 10 km/h (i.e. the wind speed 126 in the reference system of the route 114 is equal to −10 km/h in the direction of the driving speed), an aerodynamic drag acts on the commercial vehicle 150, which corresponds to a driving speed of 90 km/h along the route 114 in the event of no wind. The device 100 makes it possible to detect the driving speed relative to the air (i.e. the negative wind speed 124 in the reference system of the commercial vehicle 150) and to control the driving speed depending on this. This means that the controlled driving speed along the route 114 is controlled depending on the airstream speed relative to the air.

The driving speed through the air can be measured by means of internal sensors, i.e. the wind speed sensor 120, or external sensors, i.e. via the data interface 122 (in particular the radio data interface 122). The wind speed measurement device 120 may include an anemometer, a dynamic pressure tube or an indirect dynamic pressure measurement, for example by means of strain gauges (DMS) at bearing points of a cab of the commercial vehicle 150. The data (especially the weather data) of the server can be local, location-resolved weather data, for example with a GPS reference from the Internet. The wind speed at or in front of the commercial vehicle 150 will be detected by matching the data with a direction of travel and/or a position according to the location of the commercial vehicle 150.

The location can be carried out by means of a global satellite-based navigation system (for example a GPS signal), an on-board (for example map-based) navigation system of the commercial vehicle 150 or a combination of the two.

The control can use a tailwind in the form of a temporary greater driving speed relative to the route. In this way, a loss of time can be at least partially compensated in the event of a headwind.

In a first implementation of the control unit 140, for example in the first exemplary embodiment of the device 100, the control unit 140 controls the driving speed relative to the route 114 of the commercial vehicle 150 on the basis of the driving speed through the air (i.e. the airstream speed or the negative wind speed 124 in the reference system of the commercial vehicle 150) in such a way that optimization is carried out of the conflict between the objectives of fuel consumption (CO2 emissions with fossil fuels) and average cruising speed at driving speeds greater than 60 km/h. This control may be referred to as "Aero Adaptive Efficient Cruise" (AAEC) and/or a development of a driving speed precalculated solely on the basis of topography.

Exemplary embodiments of the device can thus be realized in combination with devices according to the current prior art (for example GPS cruise control). Only by taking into account the wind speed can further optimization of the aforementioned conflict of objectives be achieved in synergy with the topography.

For example, the commercial vehicle 150 is moving at 80 km/h driving speed and there is no wind. Then the airstream speed is 80 km/h. Accordingly, there is normal aerodynamic drag. However, if there is a headwind of 10 km/h, there is aerodynamic drag which corresponds to a driving speed of 90 km/h in the absence of wind. The headwind speed is included in the aerodynamic drag quadratically.

One exemplary embodiment of the device 100 can reduce the controlled driving speed of the commercial vehicle 150 in a headwind to save fuel and can increase the controlled driving speed within the legally permissible framework in a tailwind to make up for lost travel time during the descent. For example, the optimization effect occurs additively or disproportionately (due to the quadratic speed dependency) relative to the effect of a driving speed calculated solely on the basis of topography (for example using conventional GPS cruise control).

Figure 2A:
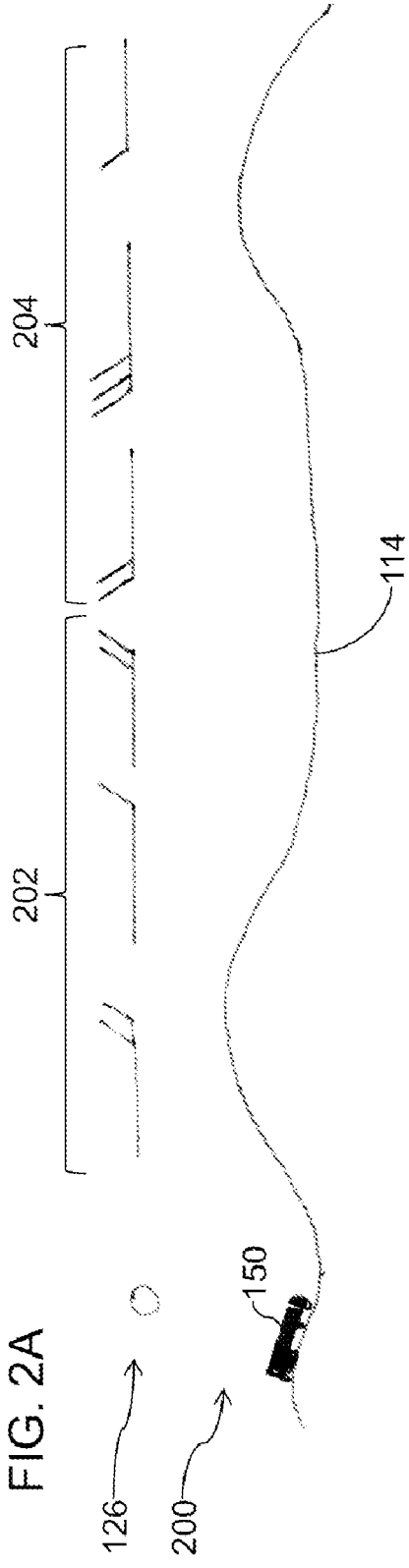
FIG. 2A shows a schematic altitude profile along a route with location-dependent wind speed in the reference system of the route.
Figure 2B:
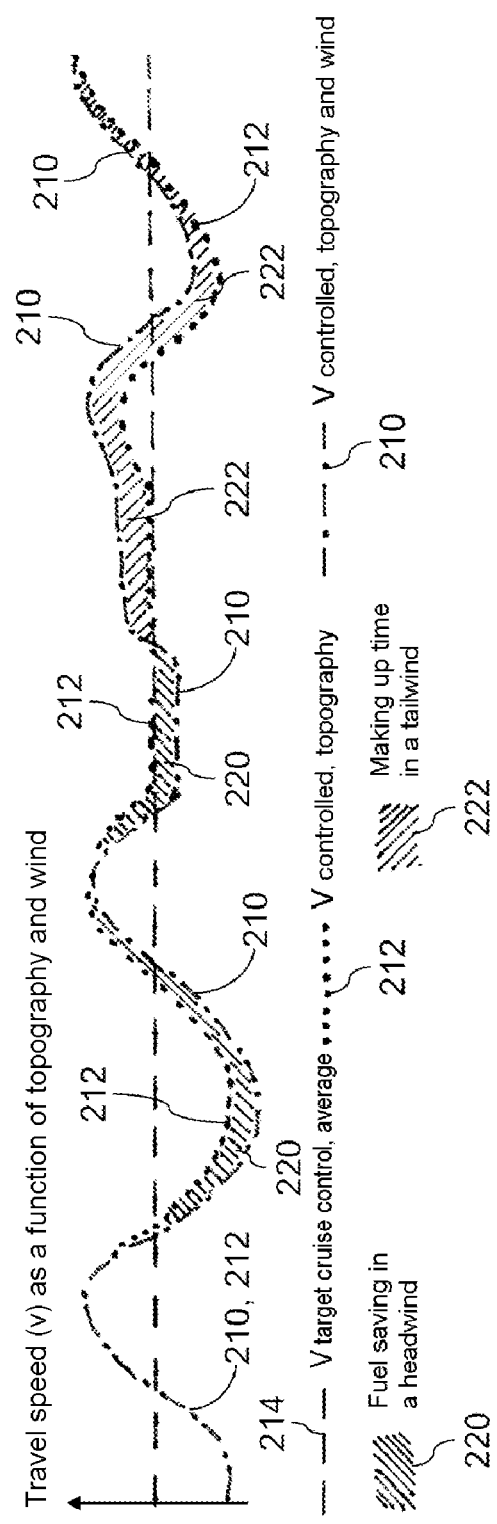
FIG. 2B shows a schematic diagram of an example of a controlled driving speed and a driving speed along the route which is precalculated only on the basis of the altitude profile of FIG. 2A, taking into account the location-dependent wind speed.

FIGS. 2A and 2B show schematically the synergistic effect by extending conventional purely topography-based control (for example GPS cruise control) to an exemplary embodiment of the device 100 (for example AAEC control). In FIG. 2A, the wind speed 126 is shown in the reference system of the route 114 and the corresponding topography 200 (in particular an altitude profile) of the route 114 is shown.

The optimization effect occurs in combination (for example over one day or over many days) because headwinds 202 and tailwinds 204 occur equally frequently in the long term due to weather changes, a change in route or a closed route without any changes in weather (for example, because a truck drives round trips). On average, a predetermined cruising speed 214 is achieved with less drive energy.

In the case of a headwind 202, the controlled driving speed 210 is less than the driving speed 212 which is precalculated solely on the basis of topography since the dependence of the controlled driving speed 210 on the detected wind speed 124 or 126 is a strictly monotonically increasing function for a given topography 200. This saves drive energy in a headwind 202 due to the quadratic speed dependence of the aerodynamic drag. This saving is denoted by the reference character 220.

With a tailwind 204, the controlled driving speed 210 is greater than the driving speed 212 which is calculated solely on the basis of the topography, since the dependence of the controlled driving speed 210 on the detected wind speed 124 or 126 is a strictly monotonically increasing function for a given topography 200. As a result, the time previously lost in a headwind is recovered in a tailwind 204. This time gain is denoted by the reference character 222.

Due to the quadratic speed dependence of the aerodynamic drag, the higher driving speed 210 in a tailwind is associated with less additional drive energy than the saving 220 in a headwind 202, so that in combination drive energy is saved without loss of time.

The airstream speed (i.e. the negative wind speed 124 in the reference system of the commercial vehicle 150) is determined by the wind speed sensor 120 internally or via the data interface 122 externally in combination with the detected driving speed.

Figure 3:
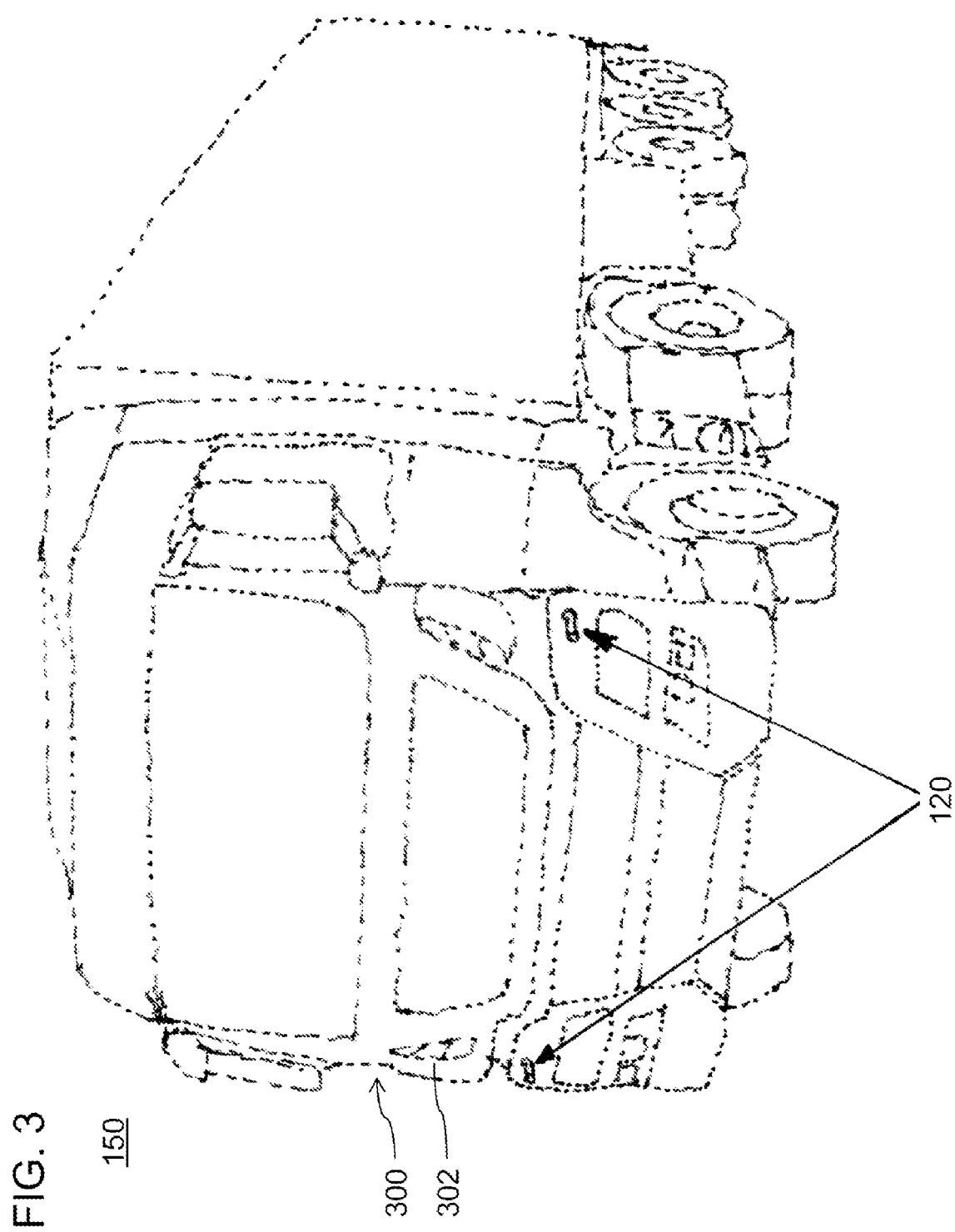
FIG. 3 shows a perspective representation of an exemplary embodiment of a wind speed sensor on the front of the commercial vehicle.

FIG. 3 shows schematically a perspective representation of a commercial vehicle 150 with an exemplary embodiment of the wind speed sensor 120 at the front 300 of the commercial vehicle 150. This sensor system on the commercial vehicle 150 is used to determine the airstream speed, i.e. (except for the sign) of the wind speed 124 in the reference system of the commercial vehicle 150.

Dynamic pressure probes as wind speed sensors 120 may be located above the headlights or in the air duct opening 302 at the front 300 of the commercial vehicle 150.

While in the exemplary embodiment of FIG. 3 dynamic pressure probes are shown as wind speed sensors 120, alternatively or additionally an existing motor fan can be used as a wind speed sensor 120, for example as an anemometer according to the disclosure document DE 10 2012 220 406 A1.

Preferably, the control unit 140 further takes into account possible gear shifting strategies situationally in the control of the driving speed 210. Here, too, the effect of energy saving occurs in combination. The controlled driving speed 210 shown schematically in FIG. 2B is not even hypothetically comparable to travelling at a constant amount of fuel injection or a constant position of the accelerator pedal, because such a driving operation is not possible with a commercial vehicle (for example a truck). If the legal maximum speed on the level were to be adhered to, the driving speed would be reduced to unacceptably low values on a greater incline (i.e. if the route is ascending). Conversely, the maximum speed allowed on the level (for example, for trucks) would be exceeded.

A second implementation of the device 100, for example the second exemplary embodiment, controls the driving speed along the route on the basis of the driving speed through the air (i.e. the airstream speed) in such a way that optimization is carried out of the conflict between the objectives of fuel consumption ($CO_2$ emissions with fossil fuels) and average cruising speed. The control is based on data via the radio data interface 122 for regional wind speed and wind direction from a server (for example from the Internet). The second exemplary embodiment can be an implementation of "Augmented Reality" or "WEB 4.0".

If the commercial vehicle is moving at a driving speed of 80 km/h and there is no wind, then the airstream speed is also 80 km/h. Accordingly, normal aerodynamic drag occurs. However, if there is a headwind of 10 km/h, aerodynamic drag occurs, which corresponds to a driving speed of 90 km/h in the absence of wind. The airstream speed is included into the aerodynamic drag quadratically. An implementation of the second exemplary embodiment derives the airstream speed from the external data of the radio data interface 122. The control of the driving speed 210 includes a reduction in the driving speed in a headwind 202 in order to save fuel, and an increase in the driving speed within the legally permissible limit in a tailwind 204 to compensate for the travel time lost in a headwind 202. The optimization effect occurs in combination over many days because headwinds and tailwinds are in balance due to climate and route management (for example, because the truck drives return trips).

The detection of the airstream speed or the wind speed 124 in the reference system of the commercial vehicle 150 is carried out by means of an information technology-supported comparison of regional weather data from the Internet with the current position and/or route of the commercial vehicle based on the location (for example by means of GPS and/or an on-board navigation system). The result of the comparison is airstream speeds relative to the coordinate system of the commercial vehicle 150. Due to the combination optimization effect, the use of regional weather data instead of accurate local weather data is sufficient. As illustrated by the above exemplary embodiment, the influence of wind strength and wind direction on the conflict of objectives between minimum drive energy and predetermined or minimum driving time can be determined by the control depending on the detected wind speed. In a first exemplary embodiment, a disproportionate saving of drive energy can be achieved in combination with the topography ahead. In a second exemplary embodiment, which can be combined with the first, external measurements (for example mobile measurements of a vehicle fleet reporting to the server, networked stationary measuring points or satellite-based air flow measurements) can be the basis of the detected wind speed.

Although the present disclosure has been described in relation to exemplary embodiments, it is apparent to a person skilled in the art that various modifications can be made, and equivalents can be used as a substitute. Furthermore, many modifications can be made to adapt a particular driving situation or a particular drive train to the teaching of the present disclosure. Consequently, the present disclosure is not limited to the disclosed exemplary embodiments but includes all exemplary embodiments which fall within the scope of the attached claims.

REFERENCE CHARACTER LIST

100 Device for controlling a driving speed of a commercial vehicle
110 Driving speed sensor
112 Driving speed
114 Route
120 Wind speed sensor
122 Data interface, in particular wireless data interface
124 Wind speed in the reference system of the commercial vehicle
126 Wind speed in the reference system of the route
130 Locating unit
140 Control unit
150 Commercial vehicle
200 Topography, especially altitude profile
210 Controlled driving speed
212 Topographically precalculated driving speed
214 Predetermined average speed
220 Energy saving
222 Time gain

The invention claimed is:

1. A device for controlling a driving speed of a commercial vehicle, comprising:
   a speed sensor designed to detect the driving speed of the commercial vehicle;
   a wind speed sensor or a data interface designed to detect a wind speed at or in front of the commercial vehicle;
   a locating unit designed to locate the commercial vehicle on a route being used by the commercial vehicle; and
   a control unit designed to control the driving speed of the commercial vehicle depending on the detected driving speed, the detected wind speed and a topography ahead of the commercial vehicle according to the location on the route, wherein the controlled driving speed in the topography ahead of the commercial vehicle is an increasing function of the detected wind speed in the direction of the driving speed.

2. The device as claimed in claim 1, wherein the detected wind speed in the direction of the driving speed includes a wind speed in the reference system of the commercial vehicle.

3. The device as claimed in claim 2, wherein the controlled driving speed is $$v_F^{(soll)} = v_F^{(topo)} + \varepsilon \cdot v'w^{(ist)}, \text{ or}$$

$$v_F^{(soll)} = v_F^{(topo)} + \varepsilon \cdot (v'w^{(ist)} + v_F^{(ist)})$$

wherein $v_F^{(topo)}$ is a precalculated driving speed based on the topography ahead, $v'w^{(ist)}$ is the detected wind speed in the reference system of the commercial vehicle, a parameter $\varepsilon$ with $0<\varepsilon\leq 1$ is a degree of consideration of the wind speed and, where appropriate, $v_F^{(ist)}$ is the detected driving speed.

4. The device as claimed in claim 3, wherein the controlled driving speed is $$v_F^{(soll)} = v_F^{(topo)} + \varepsilon \cdot v'w^{(ist)}, \text{ if } 0 < V'w^{(ist)}.$$

5. The device as claimed in claim 1, wherein the detected wind speed includes a wind speed in a reference system of the route being used by the commercial vehicle.

6. The device as claimed in claim 5, wherein the controlled driving speed is $$v_F^{(soll)} = v_F^{(topo)} + \varepsilon \cdot (v_W^{(ist)} - v_F^{(ist)}), \text{ or}$$

$$v_F^{(soll)} = v_F^{(topo)} + \varepsilon \cdot v_W^{(ist)}$$

wherein $v_F^{(topo)}$ is a precalculated driving speed based on the topography ahead, $v_W^{(ist)}$ is the detected wind speed in the direction of the driving speed, a parameter $\varepsilon$ with $0<\varepsilon\leq 1$ is a degree of consideration of the wind speed, and, where appropriate, $v_F^{(ist)}$ is the detected driving speed.

7. The device as claimed in claim 6, wherein the controlled driving speed is $$v_F^{(soll)} = v_F^{(topo)} + \varepsilon \cdot (v_W^{(ist)} - v_F^{(ist)}), \text{ if } 0 < v_F^{(ist)} < v_W^{(ist)}.$$

8. The device as claimed in claim 3, wherein the parameter $\varepsilon$ of the degree of consideration of the wind speed depends on the topography ahead and/or on an efficiency-optimized operating point or operating range of a powertrain of the commercial vehicle.

9. The device as claimed in claim 1, wherein the data interface comprises a radio data interface to a server providing weather data including the wind speed at or in front of the located commercial vehicle.

10. The device as claimed in claim 1, wherein the wind speed sensor comprises at least one strain gauge between a chassis and a body of the commercial vehicle and the at least one strain gauge is designed to detect a dynamic pressure which is dependent on the wind speed in the reference system of the commercial vehicle.

11. The device as claimed in claim 10, wherein
   the at least one strain gauge is between the chassis and the cab of the commercial vehicle, or
   the dynamic pressure includes an impact pressure of a precipitation.

12. The device as claimed in claim 1, wherein the wind speed sensor comprises at least one dynamic pressure probe mounted on a front of the commercial vehicle, which is designed to detect a dynamic pressure which is dependent on the wind speed in the reference system of the commercial vehicle.

13. The device as claimed in claim 1, wherein the controlled driving speed depends on the detected wind speed if the detected driving speed and/or the driving speed precalculated on the basis of the topography ahead is greater than a minimum speed.

14. The device as claimed in claim 13, wherein the minimum speed is 60 km/h.

15. The device as claimed in claim 1, wherein the control unit is further designed to take into account a shifting point of an automatic transmission in the powertrain of the commercial vehicle when controlling the driving speed, wherein a driving speed precalculated solely on the basis of the topography is lower than the shifting point and the controlled driving speed is greater than the shifting point, if the topography ahead contains an ascent and the detected wind speed corresponds to a tailwind.

16. A device for controlling a driving speed of a commercial vehicle, comprising:
   a driving speed sensor designed to detect the driving speed of the commercial vehicle;
   a radio data interface designed to detect a wind speed at or in front of the commercial vehicle from a server providing data containing the wind speed at or in front of the commercial vehicle; and
   a control unit designed to control the driving speed of the commercial vehicle depending on the detected driving speed and the detected wind speed, wherein the controlled driving speed is an increasing function of the detected wind speed in the direction of the driving speed.

17. The device as claimed in claim 16, further comprising:
   a locating unit which is designed to locate the commercial vehicle on a route being used by the commercial vehicle, wherein position data are sent to the server via the radio data interface and the data retrieved from the server via the radio data interface contain the detected wind speed at or in front of the located commercial vehicle.

18. A commercial vehicle comprising:
   a powertrain; and
   a device controlling the drive train as claimed in claim 1.

19. The commercial vehicle of claim 18, wherein the commercial vehicle is a truck, a towing vehicle, or a bus.

* * * * *